(12) United States Patent
Rajakarunanayake (10) Patent No.: US 7,523,255 B2
(45) Date of Patent: Apr. 21, 2009

(54) METHOD AND APPARATUS FOR EFFICIENT STORAGE AND RETRIEVAL OF MULTIPLE CONTENT STREAMS

(75) Inventor: Yasantha Nirmal Rajakarunanayake, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 180 days.

(21) Appl. No.: 11/254,364

(22) Filed: Oct. 20, 2005

(65) Prior Publication Data

US 2007/0112888 A1  May 17, 2007

(51) Int. Cl.
  *G06F 13/14* (2006.01)
(52) U.S. Cl. ........................... 711/112; 711/168
(58) Field of Classification Search ............... None
See application file for complete search history.

(56) References Cited

U.S. PATENT DOCUMENTS 6,914,746 B1 * 7/2005 Meyer ..................... 360/78.12
2002/0129200 A1 * 9/2002 Arakawa et al. ............ 711/112
2004/0168024 A1 * 8/2004 Buckingham ............... 711/111
2005/0105427 A1 * 5/2005 Cookson et al. ........... 369/47.31

* cited by examiner

*Primary Examiner*—Than Nguyen
(74) *Attorney, Agent, or Firm*—Garlick Harrison & Markison; Bruce E. Garlick; Holly L. Rudnick (57) ABSTRACT

Embodiments of the present invention provide disk controller operable to facilitate the efficient storage and retrieval of multiple content (data) streams to magnetic disk media. This disk controller includes an interface module, a memory module, and a processing module. The interface module is operable to couple the disk controller to a hard disk drive. The memory module and processing module in combination are operable to execute instructions that detect the geometry associated with the hard disk drive. Then the disk controller is operable to determine when the hard disk drive geometry supports assigning unique RW heads to unique content (data) streams. When the hard disk geometry supports assigning unique RW heads to unique content (data) streams, RW heads may be preferentially reserved or assigned to unique content streams wherein the RW heads are able to write unique content streams to memory locations within the hard disk drive, wherein these memory locations may be contiguous or near contiguous.

25 Claims, 11 Drawing Sheets

METHOD AND APPARATUS FOR EFFICIENT STORAGE AND RETRIEVAL OF MULTIPLE CONTENT STREAMS

TECHNICAL FIELD OF THE INVENTION

The present invention relates generally to magnetic disk media and more particularly to the storage and retrieval of content to magnetic disk media.

BACKGROUND OF THE INVENTION

Currently, magnetic media, such as hard disk drives are used to store (record) and retrieve (playback) multimedia content in Digital Video Recorders (DVRs). While a hard disk drive may be quite efficient at storing and playing back a single content stream, many limitations arise where two or more content streams require simultaneous access. Each stream contains data that is best accessed from contiguous locations within the hard disk drive.

Contiguous storage of such content allows faster access and reduces fragmentation. However, since the data from two or more streams is multiplexed and placed at random track locations within the hard disk drive, the read write (RW) head has to continuously move between different sections of the disk to read or write this data. Alternatively, if the content received from the multiple channels is stored within a single contiguous section or contiguous block of the disk. The data (content) from the first channel (A) and second channel (B) alternates within the single memory location (contiguous section or block of disk) creating a potentially serious fragmentation problem. This second mode of operation is typically within most disk subsystems wherein their host is blind to the internal geometry and organization within the disk.

The structure and operation of hard disk drives is generally known. Hard disk drives include, generally, a case, a hard disk having magnetically alterable properties, and a read/write mechanism including Read/Write (RW) heads operable to write data to the hard disk by locally alerting the magnetic properties of the hard disk and to read data from the hard disk by reading local magnetic properties of the hard disk. The hard disk may include multiple platters, each platter being a planar disk.

Figure 1:
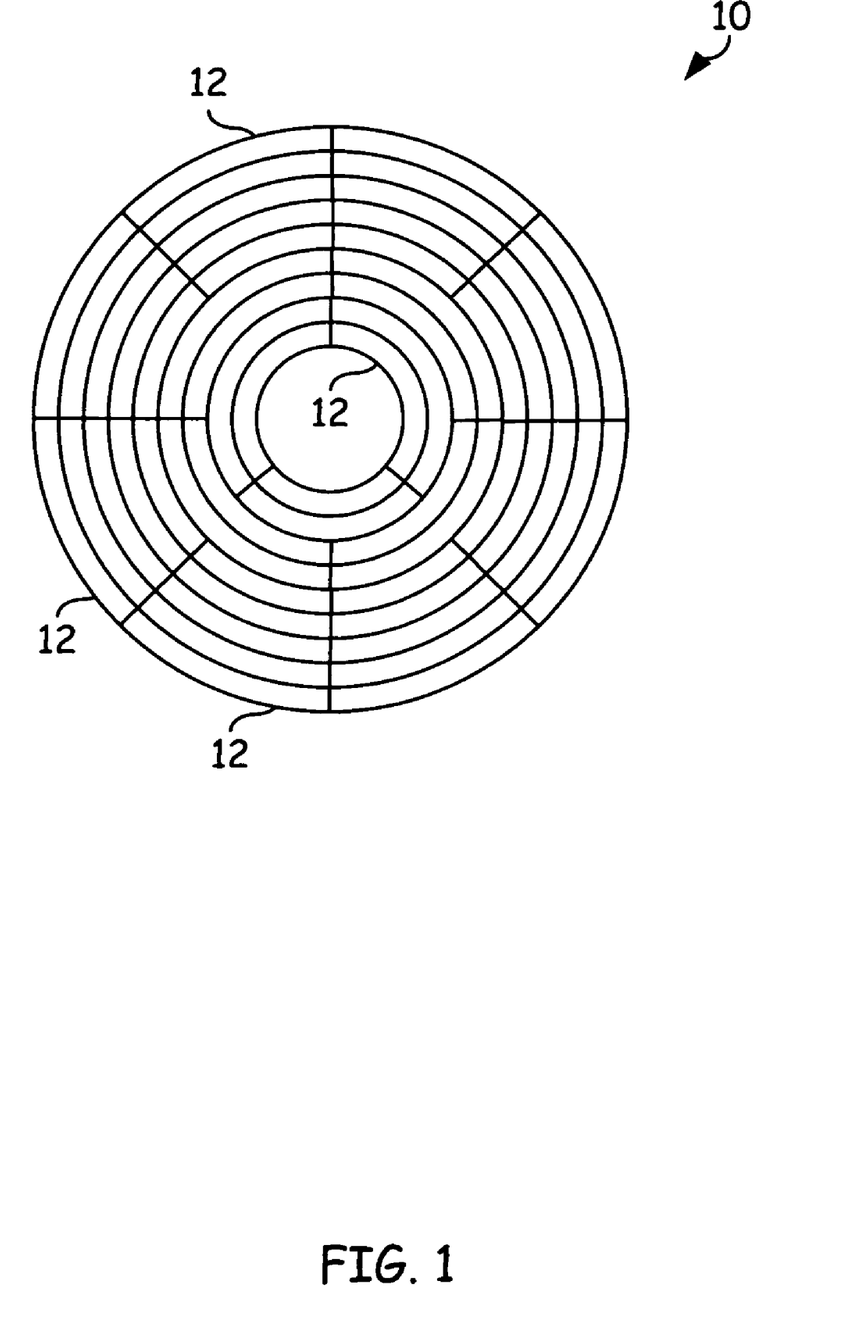
FIG. 1 depicts a pattern of radially-spaced concentric data tracks within the magnetic media of a disk.

All information stored on the hard disk is recorded in tracks, which are concentric circles organized on the surface of the platters. FIG. 1 depicts a pattern of radially-spaced concentric data tracks 12 within a disk 10. Data stored on the disks may be accessed by moving RW heads radially as driven by a head actuator to the radial location of the track containing the data. The track-based organization of data on the hard disk(s) allows for easy access to any part of the disk, which is why hard disk drives are called "random access" storage devices.

Since each track typically holds many thousands of bytes of data, the tracks are further divided into smaller units called sectors. This reduces the amount of space wasted by small files. Each sector holds 512 bytes of user data, plus as many as a few dozen additional bytes used for internal drive control and for error detection and correction.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present invention provides a method and apparatus operable to support the efficient storage and retrieval of multiple content streams to magnetic disk media that substantially addresses the above-identified needs as well as others. One embodiment provides a method with which to record simultaneous content streams to magnetic disk media. This involves receiving a first content stream via a first channel and receiving a second content stream via a second channel. A first read-write (RW) head of a multiple RW head system may be reserved or preferentially assigned to the first channel. Similarly, a second RW head of a multiple RW head disk drive may be reserved or preferentially assigned to the second channel. Memory locations (contiguous locations or blocks within the magnetic disk media) are identified that are operable to store the first and second content stream after which the RW heads are used to write the first and second content stream to disk.

Yet another embodiment provides a disk controller operable to affect efficient storage and retrieval of multiple content (data) streams to magnetic disk media. This disk controller includes an interface module, a memory module, and a processing module. The interface module is operable to couple the disk controller to a hard disk drive. The memory module and processing module in combination are operable to execute instructions that detect the geometry associated with the hard disk drive. Then the disk controller is operable to determine when the hard disk drive geometry supports assigning unique RW heads to unique content (data) streams. When the hard disk geometry supports assigning unique RW heads to unique content (data) streams, RW heads may be preferentially reserved or assigned to unique content streams wherein the RW heads are able to write unique content streams to memory locations within the hard disk drive, wherein these memory locations within the disk media may be contiguous or near contiguous.

Other embodiments of the present invention may include a hard drive operable to record and retrieve simultaneous content streams to disk that reduces fragmentation and may extend the product lifetime associated with the magnetic disk media. Yet other embodiments may include content recorders that may utilize hard disk drives or disk controllers to efficiently store simultaneous content (data) streams.

Figure 2:
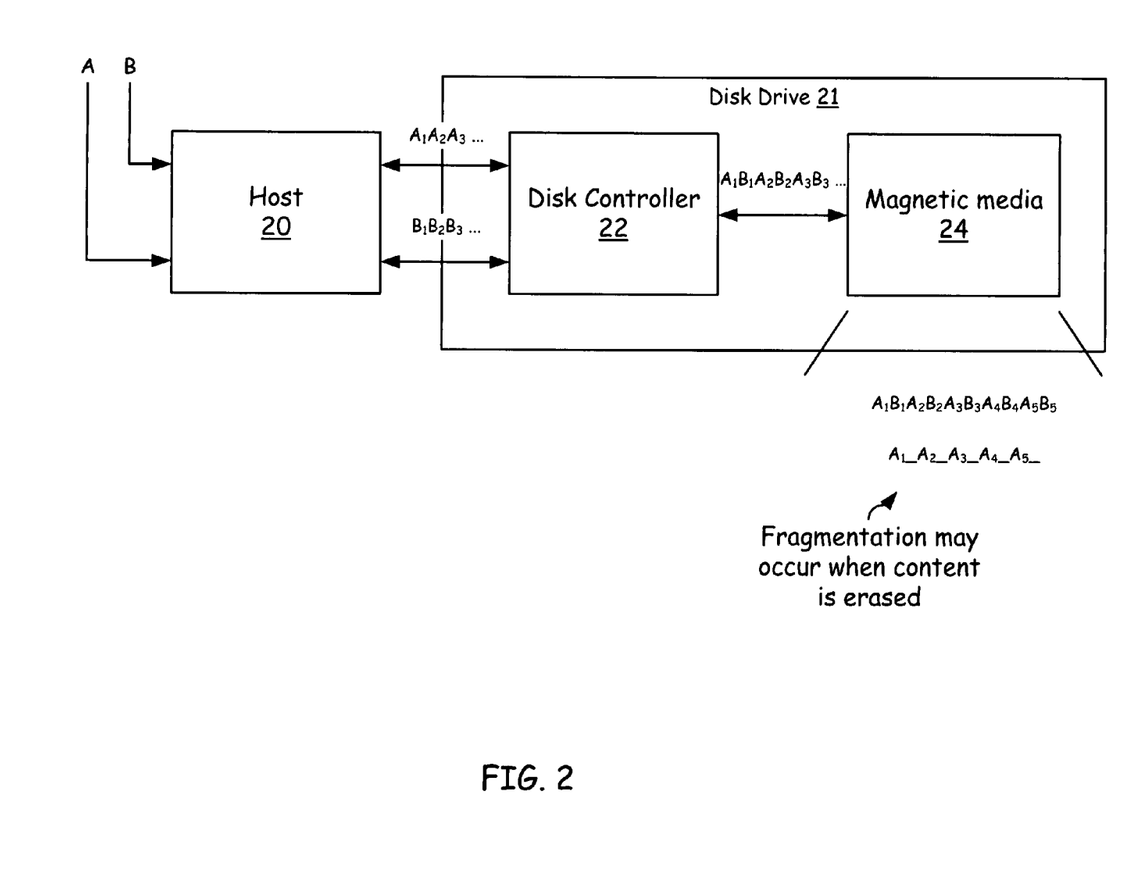
FIG. 2 is a function block diagram of a digital content recorder.

FIG. 2 depicts a storage system used to record and retrieve multiple content (data) streams to magnetic media. This system includes a host 20, disk controller 22 and magnetic media 24. Host 20 may be a set top box or other multimedia device operable to receive multiple incoming streams of multimedia shown as inputs "A" and "B" to the host. For example, when host 20 is embodied as a set top box or digital video recorder (DVR), this set top box may receive multiple inputs such as the output of an audio/video receiver, television receiver, satellite tuner receiver, other multimedia receiver, or preprocessed multimedia signals. Host 20 is operable to select the content streams to be stored. For example, a first and second channel shown here as channel A and channel B may be selected by the host and supplied to disk controller 22 for storage. Disk controller 22 then directs the storage of the streamed content from channels A and channel B onto magnetic media 24. Each content (data) stream contains data which may be best accessed from a contiguous location on the disk. However, since the data from two or more streams is multiplexed, the data may be stored as a series of data components $A_1B_1A_2B_2A_3B_3$ ... in a single location. When the content from one channel is deleted, fragmentation occurs and can further complicate the storage of additional data. This situation is represented by the data chain $A_1\_A_2\_A_3\_$ ... where the contents of channel B have been deleted. Most applications multiplex data to available magnetic media as most applications are blind to the internal geometry and organization of the disk data. As illustrated, this can result in severe fragmentation when the content associated with one data stream is erased in favor of that from a newer data stream. However, this type of solution minimizes the movement of the RW head within the disk drive. The performance of the hard drive is limited as content is written to or retrieved from a fragmented disk location.

Figure 3:
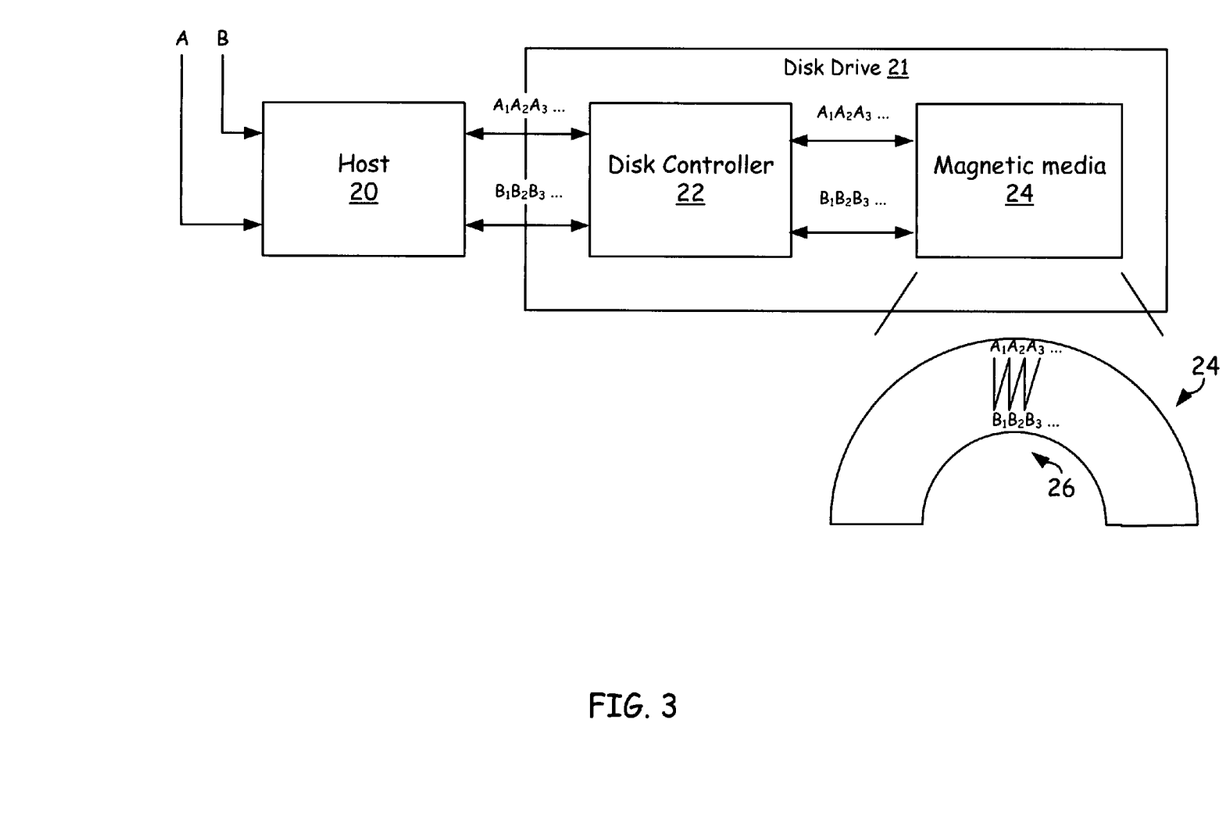
FIG. 3 is a function block diagram of a digital content recorder.

FIG. 3 provides a second solution where the content (data) stream for channel A and channel B are written to contiguous but distinct locations within the magnetic media. However, simultaneous recording of multimedia files or content streams will cause the RW head of the disk drive, to move excessively in a zigzag pattern 26 as shown. Excessive movement may cause excessive wear, noise, reduced performance, and limit the overall lifetime of the magnetic media 24 and disk drive that the magnetic media is contained within. For example, excessive noise from a host device or set top box may distract from the viewing experience. Additionally, when the set top box is recording a stream for later use, the reduced noise allows the stream content to be recorded silently. Embodiments of the present invention may reduce the noise associated with consumer appliances. This solution offers an improvement with respect to fragmentation but the mechanical wear on the disk drive itself may be excessive.

Figure 4:
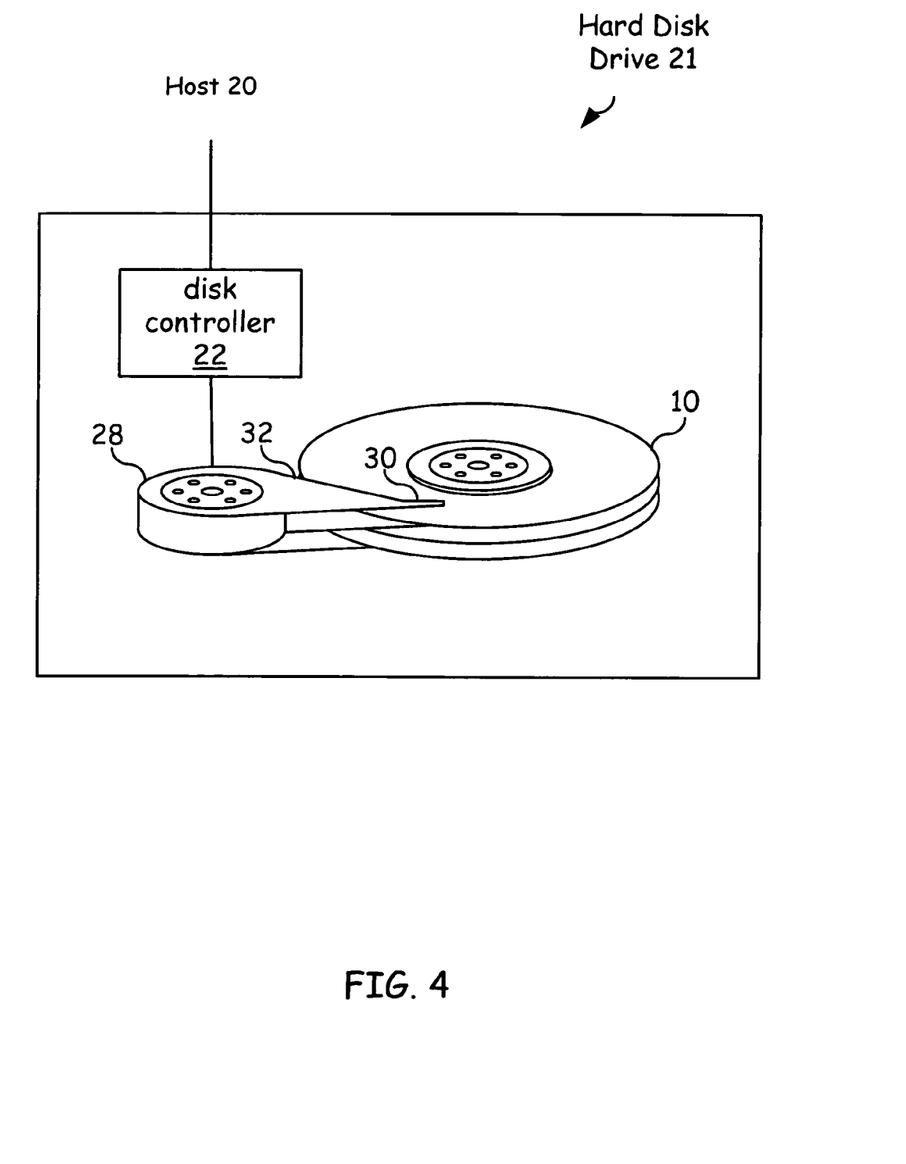
FIG. 4 is a function block diagram of a hard disk drive.
Figure 5:
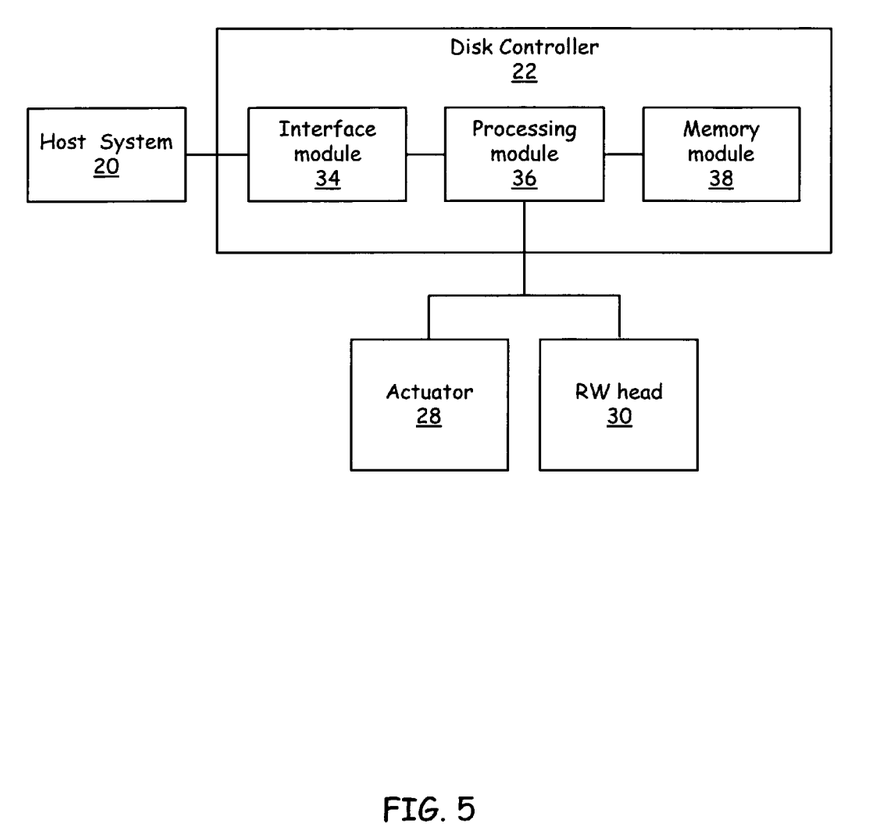
FIG. 5 is a functional block diagram of a disk controller in accordance with an embodiment of the present invention.

FIG. 4 depicts a hard disk drive 21 that includes disk controller 22, hard disk (magnetic media) 10, actuator 28, RW head 30 and positioning arm 32. Disk controller 22 as shown in FIG. 5 includes an interface module 34, processing module 36 and memory module 38. Disk controller 22, which may be implemented as an integrated circuit or series of discrete components, may interface with host system 20 and direct the operation of the other internal components within hard disk drive 21.

Processing module 36 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory module 65 may take the form of a single memory device or a plurality of memory devices. Such a memory device may be a read-only memory, random access memory, volatile memory, non-volatile memory, static memory, dynamic memory, flash memory, cache memory, and/or any device that stores digital information. Note that when the Disk controller 22 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Processing module 36 stores and executes operational instructions corresponding to at least some of the steps and/or functions illustrated with reference to FIGS. 10 and 11.

Figure 6:
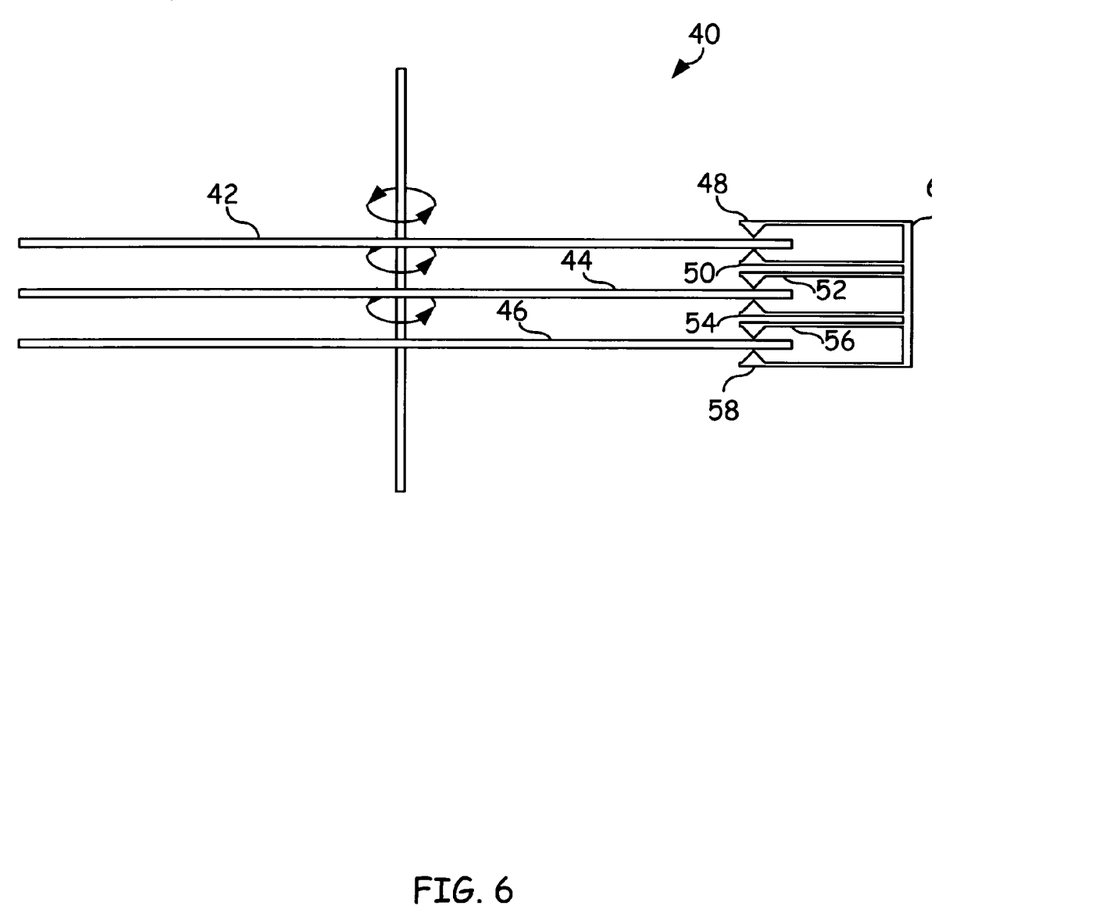
FIG. 6 is a functional diagram of a multi-platter disk drive utilized within an embodiment of the present invention.

Disk controller 22 may determine and track the disk geometry associated with the hard disk drive. The geometry includes both the number of available platters (disk surfaces) and RW heads within the hard disk drive. FIG. 6 depicts a multi-disk hard disk drive 40 having disks 42, 44 and 46. Each disk may have an available upper surface (platter) and lower surface. RW heads 48, 50, 52, 54, 56 and 58. In this multiple-head, multiple-disk system disk controller 22 may execute a protocol layer operable to reserve a particular head, 48 through 58, to a particular channel or input. In one embodiment, disk drive 40 may be configured with multiple disks 42, 44 and 46 having about 80 available gigabytes per platter. By assigning an individual head or group of heads to an individual channel or content stream, the problem of recording streamed content from a single channel to a contiguous memory location may be addressed.

The individual heads are mounted to arms that the actuator positions as a group. Thus, typical configurations do not allow each RW head to be independently positioned. However, other embodiments are envisioned where RW heads may be positioned independently or where more than one independently controlled RW head is assigned to a platter. Where the RW heads do not move independently, the disk controller may examine the available space on the top and bottom side of each disk within the hard disk drive. Then, the disk controller can determine whether or not sufficient contiguous disk space is available to store the two separate content streams within a cylinder of the disk drive. Where each content stream is stored to a separate platter.

Figure 7:
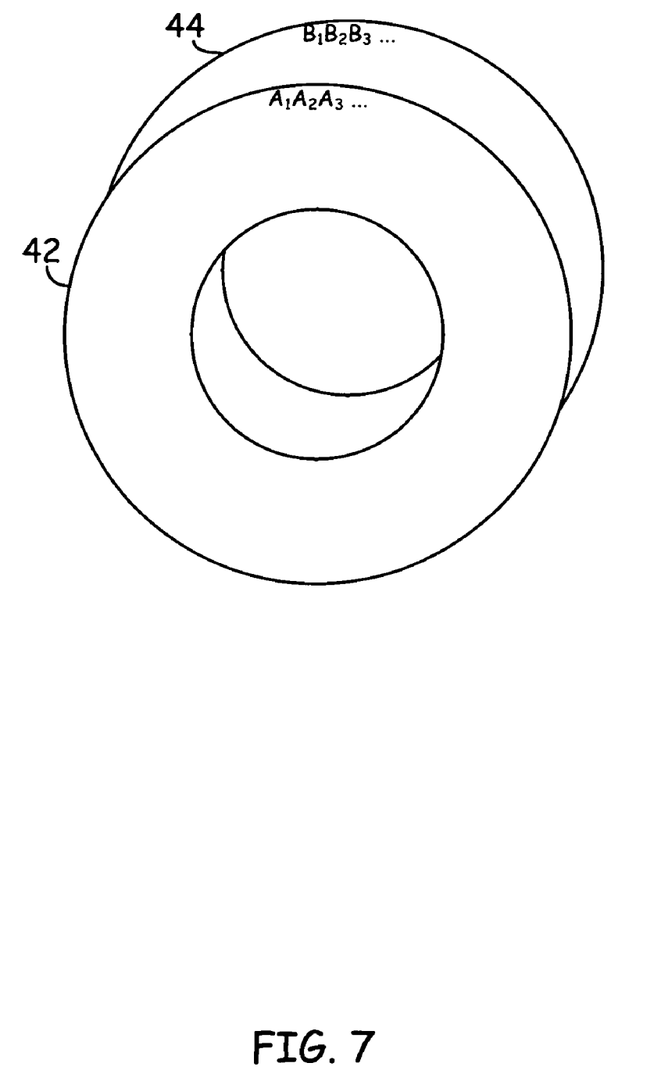
FIG. 7 is a diagram illustrating the writing of diverse content streams to different platters within a cylinder of a hard disk drive in accordance with an embodiment of the present invention.

For illustrative purposes, FIG. 7 show the content from channel "A" written to the upper platter of disk 42 and content from channel "B" written to the upper platter of disk 44, wherein the content from channels "A" and "B" are written to the same cylinder of the hard disk drive. Thus, the content from channel "A" may be written to a contiguous location on disk 42 while the content from channel "B" may be written to a contiguous location on disk 44. RW head movement may be dramatically reduced as the actuator need not continuously radially reposition the RW heads between cylinders during the recording or retrieval of a content stream or file. Additionally, the life of the magnetic media may be improved by reducing wear as content typically does not become fragmented and require as much defragmentation processing in order to defragment previously recorded content following the removal of other content. By reducing or radial movement between tracks or disk cylinders, noise associated with the device may be greatly reduced. For home appliances, this improves the user experience.

By preferentially reserving a RW head to a content stream, fragmentation and radial RW head movement while writing or retrieving content is reduced. Additional improvements may include the ability to provide independent radial movement for each head or a set of heads thereby further improving the ability of the disk controller to identify contiguous locations on which the content of a channel may be stored.

Figure 8:
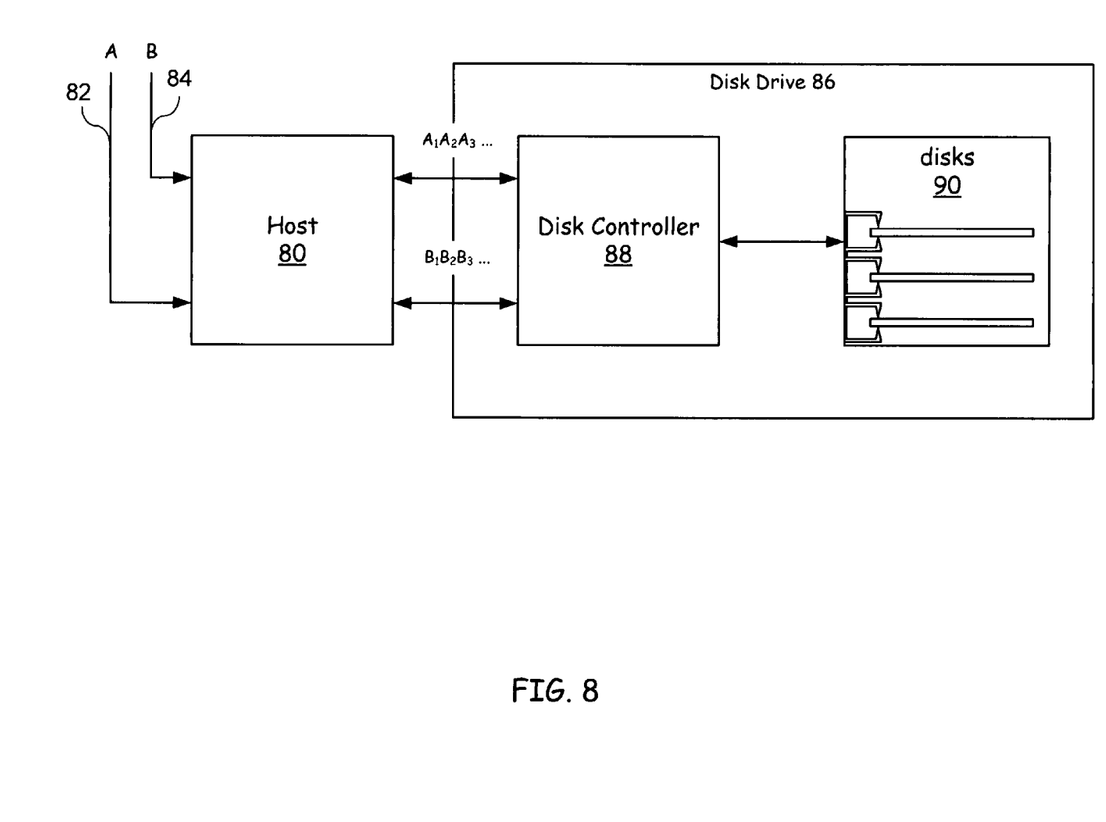
FIG. 8 provides a functional block diagram of a data storage and retrieval system in accordance with an embodiment of the present invention.

FIG. 8 provides a functional block diagram of a system operable to reserve individual read/write heads for particular channels. Here host 80 will receive data from multiple content streams such as channel "A" and channel "B". This content is provided to a hard drive 86 within or coupled to the set top box. First channel input 82 may receive a first content stream such as that provided by channel "A"; while a second channel input 84 may receive a second content stream such as that provided by channel "B". Disk controller 88 will determine whether or not the hard drive 86 contains and supports multiple heads and that sufficient contiguous space is available on disks 90 such that individual heads may be assigned to individual channels. This determination is made by disk controller 88 examining the geometry of the disk and currently stored data within the disk. Should the disk be capable of utilizing multiple heads to write data, wherein individual heads are assigned to individual channels, the disk controller will preferentially assign a RW head to a specific channel and write that content to a single platter within disks 90. These disk locations, the locations for channel A and channel B may be on different platters, different faces of individual platters, or within the same platter depending on the head and geometry of the disk drive. For example, should a disk drive have multiple RW heads available for an individual platter, content streams may be recorded to radially separate tracks. Additionally, disk controller 88 is operable to determine when a need exists to defragment stored content and rewrite that content to contiguous or near contiguous memory locations within the disk media.

Figure 9:
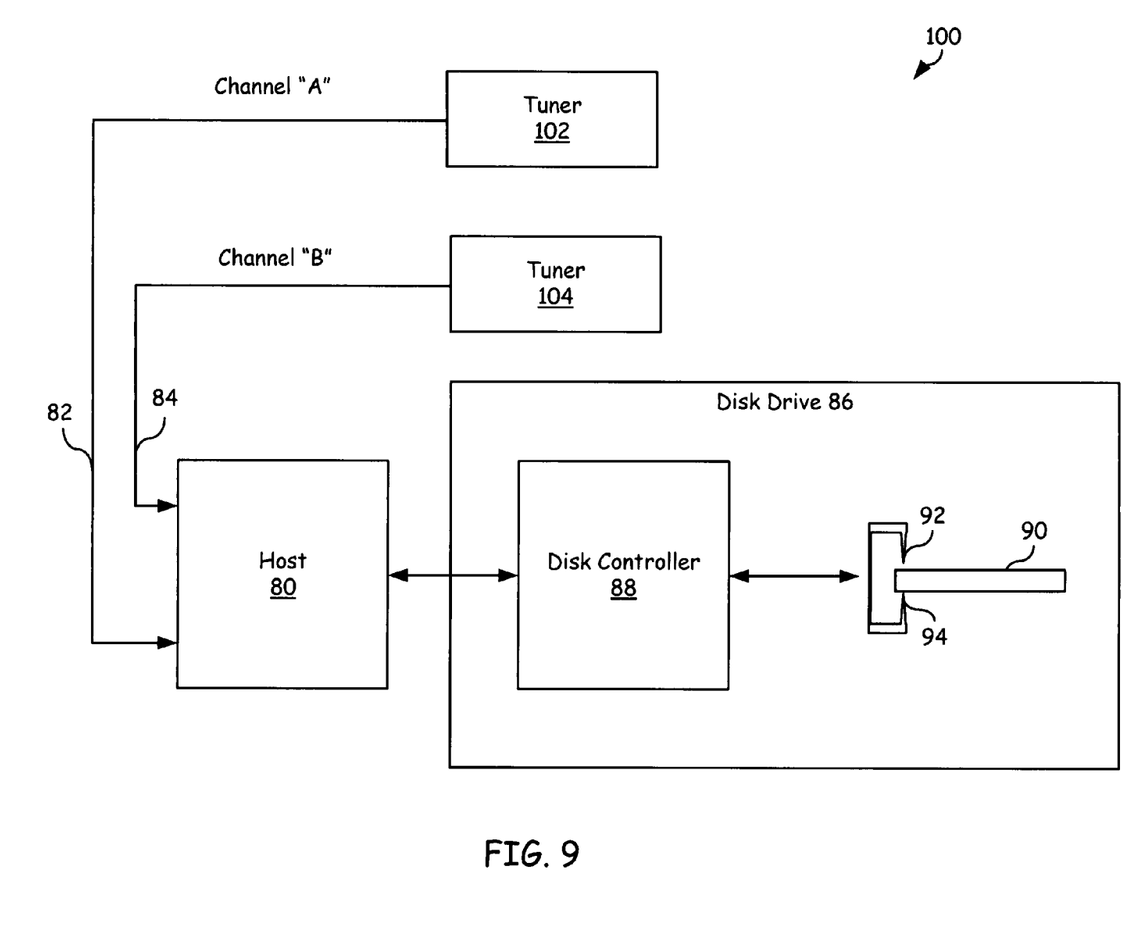
FIG. 9 provides a functional block diagram of a content recorder in accordance with an embodiment of the present invention.

FIG. 9 provides a functional block diagram of a content recorder 100 in accordance with an embodiment of the present invention. Content recorder 100 includes a first tuner 102, a second tuner 104, host 80, first channel input 82, second channel input 86, and a hard disk drive 86. Although tuners 102 and 104 are depicted as providing channels "A" and "B", an audio/video (AV) signal or other like signal may be provided to the inputs 82 and 84. Hard disk drive 86 further includes a disk controller 88, magnetic media (disks) 90 and RW heads 92 and 94. content recorder 100 Multimedia controller 80 will receive data in the form of a data stream channel A and a data stream channel B which are received at the first channel input 84 and second channel input 86, respectively. This data is directed by host controller 82 to be stored for retrieval on hard drive 90. The disk controller within hard drive 90 couples to and receives the first content stream and second content stream from first channel input 84 and second channel input 86. The disk controller determines when and if multiple RW heads 92 and 94 are available to write simultaneous streams to disk 90. Typically, this function may have been performed by the host device and not the disk controller. By delegating this task when possible to the disk controller, the processor within the host device is available to perform other tasks. If the hardware configuration of the hard disk drive and the available memory locations within the disk(s) allow multiple RW heads to be assigned to write simultaneous content streams to disk, then the disk controller will reserve a first RW head to the first content stream and reserve a second RW head to the second content stream. Then the disk controller having determined a first and second memory location operable to store the first and second content, will direct that the content be stored in these locations.

Figure 10:
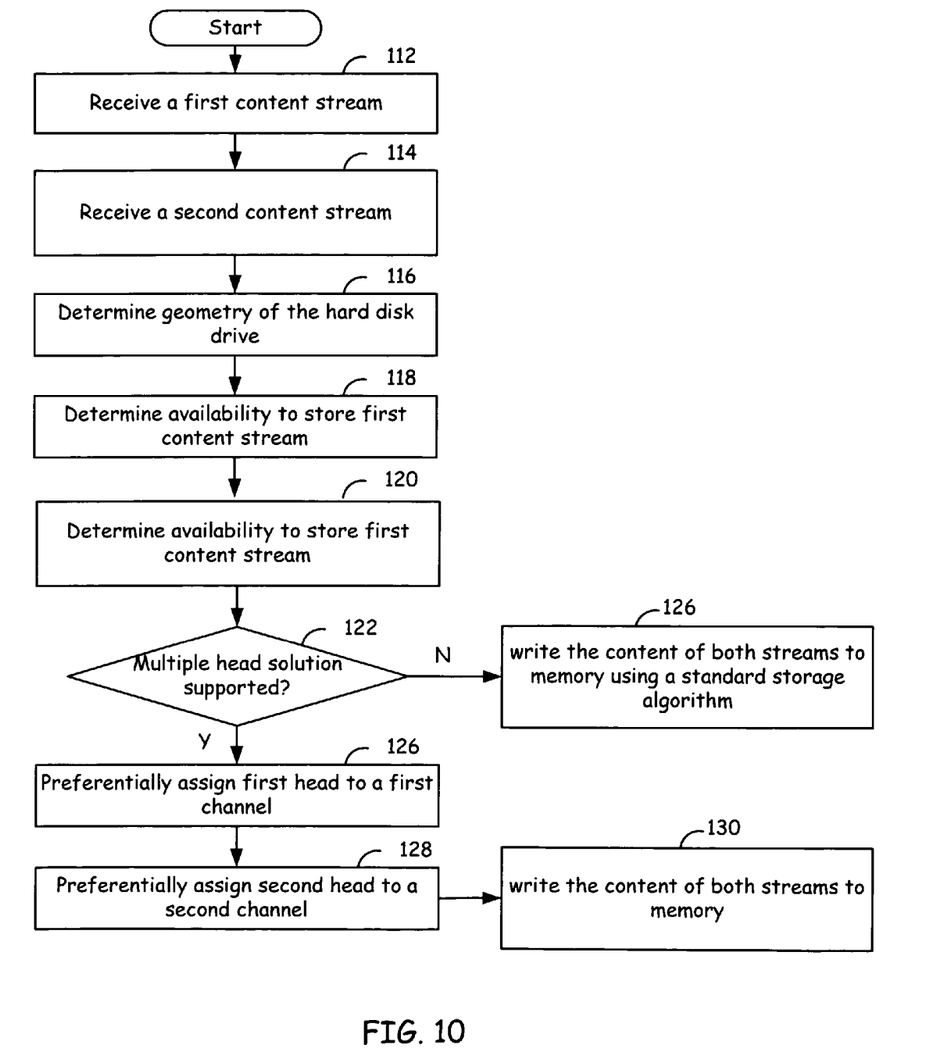
FIG. 10 provides a logic flow diagram illustrating a method operable to preferentially assign RW heads to content streams in accordance with an embodiment of the present invention.

FIG. 10 is a logic flow diagram depicting a method operable to store simultaneous content streams to memory in accordance with an embodiment of the present invention. This involves in first step 112 receiving a first content stream. A second content stream is received in step 114. A disk controller associated with a hard drive to which the content stream will be stored will determine the geometry on the hard drive at set point 116. Determining the geometry of the hard drive will involve both determining the number of RW heads that are available and the geometrical location of contiguous memory storage locations available on the individual disks within the hard drive. In step 118, the disk controller determines, based on the geometry of the hard drive, the availability of a first memory location within the disk media operable to store the first content stream. Similarly, step 120 determines the availability of a second memory location within the disk media operable to store the second content stream. At decision point 122, a determination is made as to whether or not the hardware configuration supports multiple heads and whether or not the geometry of the available memory locations within the disk media supports the implementation. If either the availability of heads or the availability of disk space is not available, then step 124 will write the content of both streams to memory using a standard storage algorithm. Otherwise, when the geometry of the hard drive supports a multiple head configuration, the disk controller will determine the best memory locations based on multiple head access with lowest fragmentation and head/track movement. Then in step 126, a first head will be assigned or reserved to the first channel. In step 128, a second head, an additional head, will be assigned to the second channel. Then in step 130, the contents of the first content stream and the second content stream are written to disk using the first and second RW heads.

Figure 11:
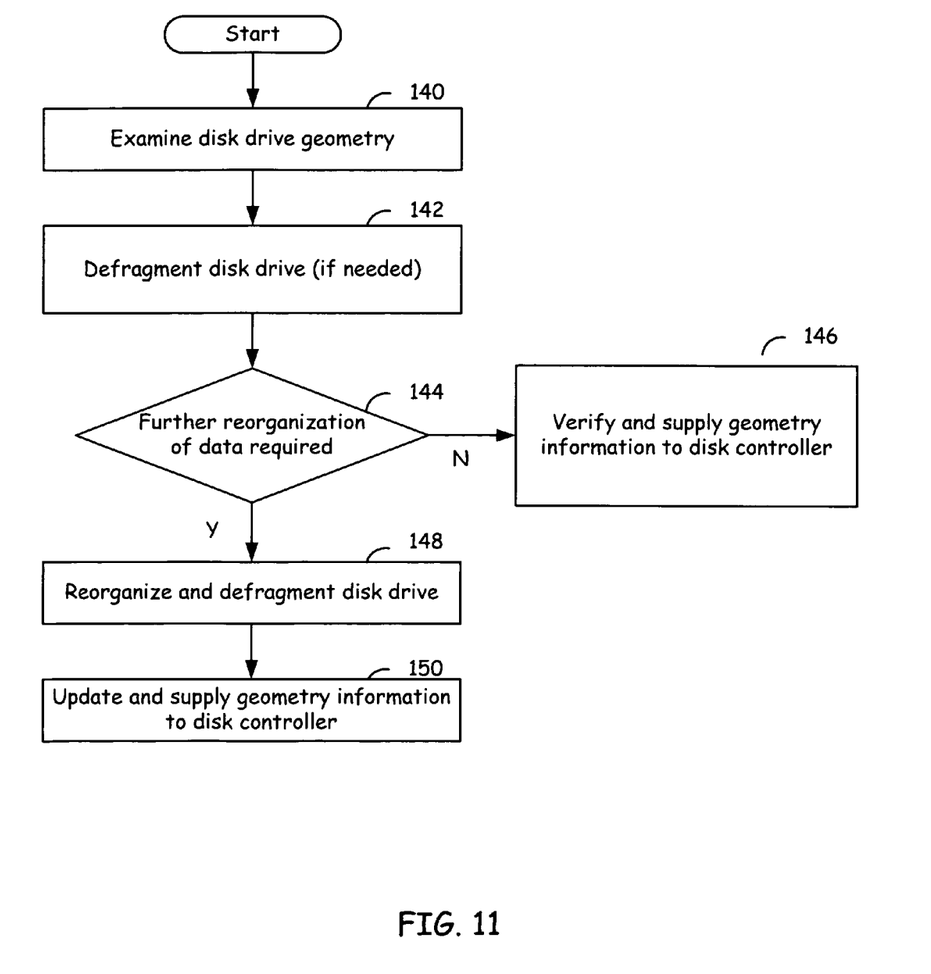
FIG. 11 provides a logic flow diagram in accordance with an embodiment of the present invention.

FIG. 11 provides the second logic flow diagram wherein the disk controller within embodiments of the present invention is operable to improve the availability of memory locations within the hard drive in order to support multiple head access. In step 140, the disk controller will examine the hardware configuration and geometry associated with the memory of the contents written to disk. If necessary in step 142, the memory will be defragmented such that individual content files, such as multimedia files, are stored in contiguous memory locations. At decision point 144 a determination will be made whether or not it is necessary to further defragment the disk media. For example, if content is stored in a contiguous or near contiguous disk location, but written in a scattered manner within the disk location, disk performance may be improved by reorganizing the content within the contiguous disk location. If not, in step 146 the geometry information associated with the hard drive is verified and supplied to the disk controller. If however, further reorganization of the content is required at decision point 144, the reorganization and defragmentation process of the disk is performed in step 148. Afterwards, the geometry information associated with the hard drive is updated to the disk controller in step 150. This helps to ensure that the memory in the hard drive is configured in order to best support multiple head access. Supporting multiple head access improves the overall performance of the hard drive.

During the defragmentation process, the disk controller may write data temporarily to memory accessible to the disk controller. This may reduce or eliminate the need to use memory available through a host device to support the defragmentation process. This reduces communicating between the host device and hard drive and further allows the host device to perform other tasks.

In summary, embodiments of the present invention provide disk controller operable to facilitate the efficient storage and retrieval of multiple content (data) streams to magnetic disk media. This disk controller includes an interface module, a memory module, and a processing module. The interface module is operable to couple the disk controller to a hard disk drive. The memory module and processing module in combination are operable to execute instructions that detect the geometry associated with the hard disk drive. Then the disk controller is operable to determine when the hard disk drive geometry supports assigning unique RW heads to unique content (data) streams. When the hard disk geometry supports assigning unique RW heads to unique content (data) streams, RW heads may be preferentially reserved or assigned to unique content streams wherein the RW heads are able to write unique content streams to memory locations within the hard disk drive, wherein these disk locations may be contiguous or near contiguous.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A method operable to store simultaneous content streams to magnetic disk media, comprising:

receiving a first content stream streamed to a host device coupled to the magnetic disk media via a first channel;

receiving a second content stream streamed simultaneous to the first content stream to the host device via a second channel;

reserving a first read/write (RW) head of a multiple RW head memory system for the first channel;

reserving a second RW head of the multiple RW head memory system for the second channel;

determining a first disk location operable to store the first content stream, the first disk location comprising a plurality of data blocks wherein the plurality of data blocks of the first disk location is substantially contiguous;

determining a second disk location operable to store the second content stream, the second disk location comprising a plurality of data blocks wherein the plurality of data blocks of the second disk location is substantially contiguous, wherein the first disk location and second disk location are based on multiple head access to the first disk location and second disk location; and writing the first content stream to the first disk location and the second content stream to the second disk location.

2. The method of claim 1, wherein the magnetic disk media comprises a hard drive.

3. The method of claim 2, wherein the first RW head is assigned to an upper face of a platter within the hard drive and the second RW head is assigned to a lower face of the platter within the hard drive.

4. The method of claim 2, wherein the first RW head and second RW head are operable to be independently positioned within the hard drive.

5. The method of claim 1, wherein the content stream is an audio/video (AV) stream.

6. The method of claim 1, further comprising:

determining if defragmentation of the magnetic disk media is required; and defragmenting the magnetic disk media.

7. A hard drive operable to store simultaneous content streams to disk, comprising:

a first channel input operable to receive a first content stream streamed to a host device coupled to the hard drive via a first channel;

a second channel input operable to receive a second content stream streamed simultaneous to the first content stream to the host device via a second channel;

at least one platter operable to store content streams;

a first read/write (RW) head;

a second RW head;

a disk controller operably coupled to the first channel input, second channel input, first RW head, and second RW head, wherein the disk controller is operable to:

determine when multiple RW heads are available to write simultaneous content streams to disk;

reserve a first RW head to the first channel when multiple RW heads are available;

reserve a second RW head to the second channel when multiple RW heads are available;

determine a first disk location operable to store the first content stream, the first disk location comprising a plurality of data blocks wherein the plurality of data blocks of the first disk location is substantially contiguous;

determine a second disk location operable to store the second content stream, the second disk location comprising a plurality of data blocks, wherein the plurality of data blocks of the second disk location is substantially contiguous, wherein the first disk location and second disk location are based on multiple head access to the first disk location and second disk location; and write the first content stream to the first disk location and the second content stream to the second disk location.

8. The hard drive of claim 7, wherein the first RW head is assigned to an upper face of the at least one platter, and the second RW head is assigned to a lower face of the at least one platter.

9. The hard drive of claim 7, wherein the first RW head and second RW head are operable to be independently positioned within the hard drive.

10. The hard drive of claim 7, wherein the content stream is an audio/video (AV) stream.

11. The hard drive of claim 7, wherein the disk controller is further operable to:
   determine when defragmentation of the hard drive is required; and
   defragment the hard drive.

12. The hard drive of claim 7, wherein the disk controller is operable to write the first content stream and the second content stream to the disk using a standard storage algorithm when multiple RW heads are not available.

13. The hard drive of claim 12, wherein the disk controller is operable to:
   defragment the stored first content stream and the second content stream to substantially contiguous disk locations after writing the first content stream and the second content stream to memory using the standard storage algorithm.

14. A multimedia content recorder operable to receive and store simultaneous content streams, comprising:
   a first channel input operable to receive a first content stream streamed thereto via a first channel;
   a second channel input operable to receive a second content stream streamed simultaneous to the first content stream thereto via a second channel;
   a hard drive operable to store simultaneous content streams, wherein the hard drive further comprises:
      at least one platter operable to store content streams;
      a first read/write (RW) head;
      a second RW head;
      a disk controller operably coupled to the first channel input, second channel input, first RW head, and second RW head, wherein the disk controller is operable to:
         determine when multiple RW heads are available to write simultaneous content streams to disk;
         reserve a first RW head to the first channel when multiple RW heads are available;
         reserve a second RW head to the second channel when multiple RW heads are available;
         determine a first disk location operable to store the first content stream, the first disk location comprising a plurality of data blocks wherein the plurality of data blocks of the first disk location is substantially contiguous;
         determine a second disk location operable to store the second content stream, the second disk location comprising a plurality of data blocks, wherein the plurality of data blocks of the second disk location is substantially contiguous, wherein the first disk location and second disk location are based on multiple head access to the first disk location and second disk location; and
         write the first content stream to the first disk location and the second content stream to the second disk location.

15. The multimedia content recorder of claim 14, farther comprising:
   a first tuner operable to provide the first content stream to the first channel input; and
   a second tuner operable to provide the second content stream to the second channel input.

16. The multimedia content recorder of claim 14, wherein the first RW head is assigned to an upper face of the at least one platter, and the second RW head is assigned to a lower face of the at least one platter.

17. The multimedia content recorder of claim 14, wherein the first RW head and second RW head are operable to be independently positioned within the hard drive.

18. The multimedia content recorder of claim 14, wherein the content stream is an audio/video (AV) stream.

19. The multimedia content recorder of claim 14, wherein the disk controller is farther operable to:
   determine when defragmentation of the hard drive is required; and
   defragment the hard drive.

20. The multimedia content recorder of claim 14, wherein the disk controller is operable to write the first content stream and the second content stream to data blocks when multiple RW heads are not available.

21. The multimedia content recorder of claim 20, wherein the disk controller is operable to:
   defragment the stored first content stream and the second content stream to near contiguous disk locations after writing the first content stream and the second content stream to data blocks.

22. A disk controller, comprising:
   an interface module operable to couple the disk controller to a hard disk drive;
   a memory module; and
   a processing module operably coupled to the memory module, wherein a combination of the processing module and memory module is operable to execute instructions that:
      detect a geometry associated with the hard disk drive;
      reserve a first read/write (RW) head to a first content stream streamed to a host device coupled to the disk controller via a first channel when the hard disk drive geometry supports assigning unique RW heads to unique content streams;
      reserve a second RW head to a second content stream streamed simultaneous to the first content stream to the host device via a second channel when the hard disk drive geometry supports assigning unique RW heads to unique content streams;
      write the first content stream to a first disk location in the hard disk drive with the first RW head, the first disk location comprising a plurality of data blocks wherein the plurality of data blocks of the first disk location is substantially contiguous;
      write the second content stream to a second disk location in the hard disk drive with the second RW head, the second disk location comprising a plurality of data blocks wherein the plurality of data blocks of the second disk location is substantially contiguous.

23. The disk controller of claim 22, wherein the first disk location and the second disk location are within a cylinder of the hard disk drive.

24. The disk controller of claim 22, wherein the disk controller is implemented as an integrated circuit.

25. A disk controller, comprising:

an interface module operable to couple the disk controller to a hard disk drive;

a memory module; and a processing module operably coupled to the memory module, wherein a combination of the processing module and memory module is operable to execute instructions that:

detect a geometry associated with the hard disk drive;

reserve a first read/write (RW) head to a first content stream streamed to a host device coupled to the disk controller via a first channel when the hard disk drive geometry supports assigning unique RW heads to unique content streams;

reserve a second RW head to a second content stream streamed simultaneous to the first content stream to the host device via a second channel when the hard disk drive geometry supports assigning unique RW heads to unique content streams;

write the first content stream to a first disk location in the hard disk drive with the first RW head;

write the second content stream to a second disk location in the hard disk drive with the second RW head, wherein the first disk location and the second disk location are within a cylinder of the hard disk drive.

* * * * *

UNITED STATES PATENT AND TRADEMARK OFFICE
CERTIFICATE OF CORRECTION

PATENT NO.        : 7,523,255 B2                                              Page 1 of 1
APPLICATION NO.   : 11/254364
DATED             : April 21, 2009
INVENTOR(S)       : Yasantha Nirmal Rajakarunanayake

It is certified that error appears in the above-identified patent and that said Letters Patent is hereby corrected as shown below:

Column 10, line 4, in Claim 15: replace "farther" with --further--.

Column 10, line 20, in Claim 19: replace "farther" with --further--.

Signed and Sealed this

Thirtieth Day of June, 2009

JOHN DOLL
*Acting Director of the United States Patent and Trademark Office*